United States Patent [19]

Ih

[11] Patent Number: 4,768,852
[45] Date of Patent: Sep. 6, 1988

[54] APPARATUS FOR OPTICAL FIBER COMMUNICATION USING TRAVELLING WAVE ACOUSTO-OPTICAL MODULATOR AND INJECTION LOCKED LASERS

[75] Inventor: Charles C. Ih, Newark, Del.

[73] Assignee: University of Delaware, Newark, Del.

[21] Appl. No.: 802,638

[22] Filed: Nov. 27, 1985

Related U.S. Application Data

[62] Division of Ser. No. 461,723, Jan. 28, 1983.

[51] Int. Cl.$^4$ .......................... G02B 6/10; G02F 1/00; H01S 3/19
[52] U.S. Cl. .............................. 350/96.13; 350/96.11; 350/96.12; 350/96.14; 350/358; 455/608; 455/609; 455/610; 455/612; 372/44
[58] Field of Search ............... 350/96.11, 96.12, 96.13, 350/96.14, 96.15, 96.16, 96.18, 358; 455/608, 609, 610, 612; 370/3; 372/44

[56] References Cited

U.S. PATENT DOCUMENTS

| | | | |
|---|---|---|---|
| 3,827,000 | 7/1974 | Matsushita et al. | 350/96.14 |
| 3,908,121 | 9/1975 | Riseberg et al. | 350/96.13 |
| 4,120,569 | 10/1978 | Richards Jr. | 350/96.14 |
| 4,126,834 | 11/1978 | Coppock | 455/611 |
| 4,206,347 | 6/1980 | Avicola et al. | 455/609 |
| 4,210,803 | 7/1980 | Ih | 350/96.14 |
| 4,332,441 | 6/1982 | Margolis | 350/358 |
| 4,579,417 | 4/1986 | Ih | 350/96.11 |
| 4,644,267 | 2/1987 | Tsui et al. | 350/358 |
| 4,696,061 | 9/1987 | Labrum | 455/609 |
| 4,702,550 | 10/1987 | Sano | 350/96.15 X |

FOREIGN PATENT DOCUMENTS 57-49925 3/1982 Japan ............................. 350/96.13

OTHER PUBLICATIONS

Denton, "The Laser and PCM" Bell Labs Record Jun. 1968 pp. 175–179.
Culshaw et al., "Integrated Optic Frequency Shifter Modulator" Elect. Lett. 2/81 vol. 17 No. 3 pp. 135–136.
Hamilton et al., "An Integrated Optic RF Spectrum Analyser" Optical Engineering Sep./Oct. 1977 vol. 16 No. 5 pp. 475–478.
Adhov et al., "Traveling Wave Amplitude Modulator . . ." Applied Optics vol. 20 No. 5 3/81 pp. 867–871.
"Characteristics of and Requirements for Sub-nanometer-Wavelength Multiplexing", Tech'l Digest of the 1981 International Conference on Integrated Optics and Optical Fiber Communication (IOOC '81) Apr. 27–29, 1981, San Francisco, Calif., by C. S. Ih and Bing-Yan Chen.
"A Direct RF Compatible Optical Fiber Transmission System", Proceedings of the International Conference on LASER '80, Dec. 15–19, 1980, New Orleans, La., by C. S. Ih, Bing-Yan Chen, and A. Mallya.

(List continued on next page.)

Primary Examiner—William L. Sikes
Assistant Examiner—Brian M. Healy
Attorney, Agent, or Firm—Connolly & Hutz

[57] ABSTRACT

Method and apparatus for frequency domain modulation optical fiber communication particularly useful for digital and analog signal transmission comprising, in the order recited, a plurality of parallel-connected signal input units each incorporating individual laser sources provided with means modulating the output radiations of said laser sources responsive to individual signal inputs, thereby establishing, for each signal input, an individual optical information wave train, a collimating lens, an acousto-optical modulator means introducing a sub-carrier signal developing a beat frequency with said optical information wave train, an optical fiber coupler transmitting the resulting signal through an optical fiber to a common square law detector and an information receiver isolating a preselected individual signal input according to its associated individual sub-carrier frequency, said individual sub-carrier frequencies being spaced one from another by a frequency interval forestalling interference in the reception of said individual signal inputs.

3 Claims, 4 Drawing Sheets

OTHER PUBLICATIONS

"Subnanometer Wavelength Multiplexing for Fiber Optical Communication", Jornal of the Optical Society of America (JOSA) 70 1569 (Dec. 1980) by C. S. Ih and Bing-Yan Chen.

"A New Waveguide Switch/Modulator for Integrated Optics" by W. E. Martin, Appl. Phys. Lett., 26, 562 (May 1975).

C. S. Ih "Feasibility and Requirements for Disperson Compensation in Coherent FOC" submitted to the International Symposium on Optical Waveguide Sciences", Jun. 20-23, 1983, Guilin, China.

R. I. MacDonald and K. O. Hill, "Avalanche Optoelectronic Downconverter", Optics Letters, 7 No. 2 Feb. 1982.

WH2 "Integrated-Optic Spectrum Analyzer: Current Status" by D. Mergerian and E. C. Malarkey, p. 114, Tech'l Digest of the Third International Conference on Integrated Optics and Optical Fiber Communication (IOOC '81), Apr. 27-29, 1981.

WH3 T. R. Ranganath, "Integrated Optic Spectrum Analyzer: A First Demonstration", p. 114, Tech'l Digest of the Third International Conference on Integrated Optics and Optical Fiber Communication (IOOC '81), Apr. 27-29, 1981, San Francisco, Calif.

H. A. Haus "Picosecond Optical Sampling" Proceedings of the Joint Meeting of the NSF Grantee-User Group in Optical Communication and the National Telecommunications and Information Administration Task Force on Optical Communication, May 27-29, 1981, p. 90, St. Louis, Mo.

APPARATUS FOR OPTICAL FIBER COMMUNICATION USING TRAVELLING WAVE ACOUSTO-OPTICAL MODULATOR AND INJECTION LOCKED LASERS

This application is a division of application Ser. No. 461,723, filed Jan. 28, 1983.

BACKGROUND OF THE INVENTION

The applicant and associates recently described and demonstrated a new modulation system, termed a TDHM (i.e., Time Domain Holography Modulation), refer (1) *Characteristics of and Requirements for Subnanometer-Wavelength Multiplexing,* Technical Digest of the 1981 International Conference on Integrated Optics and Optical Fiber Communication (IOOC '81), Apr. 27-29, 1981, San Francisco, CA, by C. S. Ih and Bing-Yan Chen; (2) *A Direct RF Compatible Optical Fiber Transmission System,* Proceedings of the International Conference on LASER '80, Dec. 15-19, 1980, New Orleans, LA by C. S. Ih, Bing-Yan Chen and A. Mallya; (3) *Subnanometer-Wavelength Multiplexing for Fiber-Optical Communication,* Journal of the Optical Society of America (JOSA), 70, 1569 (December 1980) by C. S. Ih and Bing-Yan Chen; (4) C. S. Ih, JOSA, 68, 1384 (October, 1978); and (5) U.S. Pat. No. 4,210,803 issued July 1, 1980 to Charles S. Ih.

Basically, TDHM can be achieved with a single frequency laser and with apparatus similar to a Mach-Zender interferometer, such as described by W. E. Martin in his article (6) entitled *A New Waveguide Switch-/Modulator for Integrated Optics,* Appl. Phys. Lett., 26, 526 (May 1975), modified by the inclusion of an AO (Acousto Optical) or SAW (Surface Acoustic Wave) modulator.

However, by incorporating an AO or SAW modulator in one of the arms, the modulated laser beam is automatically put on a (sub) carrier. The laser beam can then be effectively Amplitude, Frequency, Phase or Single Side Band (SSB) modulated (with respect to the subcarrier) through the input of the Acoustic Optical Modulation (AOM) as described in references (4) and (5) supra.

By using frequency up-shifting and down-shifting alternatively, it appears that high orders (up to the third) fiber dispersions (for single mode fibers) can be compensated (7) C. S. Ih, Feasibility and Requirements for Dispersion Compensation in Coherent FOC, submitted to the International Symposium on Optical Waveguide Sciences, June 20-23, 1983, Guilin, China.

As described in the Ih patent, reference (5) supra, in TDHM the laser beam is first split into two beams, one of which is reserved as a reference beam. The other beam is the information beam and is modulated and frequency-shifted by an acousto-optical (AO) or surface-acoustic wave (SAW) modulator. SAWs are used for implementing TDHM in an integrated-optics (10) form. The information and reference beams are then combined and coupled into an optical fiber for transmission. A photo diode, which is a square-law detector, detects the beat frequency between the reference and information beams and thus reproduces the original signal (on a carrier) at the receiving end, all as detailed in reference (5) supra. The carrier $F_c$ can be a frequency anywhere in the range from several tens of mHz to tens of GHz.

The TDHM system can be used for subnanometer wavelength multiplexing (refer references (1) and (3) supra) and for direct RF compatible transmission (refer reference (2) supra). Despite these advantages, because the Bragg angle conditions must be satisfied for the AO and SAW modulators, and also because of their finite transition time, the information bandwidth for each channel is limited. Large information bandwidth can be attained only by using a large number of channels. In order to minimize cross-modulation between channels, a strong reference beam must be used. Optical power channeled into the reference beam is largely wasted, since it carries no information. For these reasons, the TDHM per se is not well-suited for either long distance digital transmission or for high bit rate.

This invention provides an improved TDHM whereby both digital (and analog) information can be efficiently transmitted. Since the digital (and some analog) information is automatically put on a "carrier", the new system is suitable for increasing digital rate through Frequency Division Multiplexing (FDM). The potential advantages of my FDM system over the conventional TDHM system are as follows: (a) the noise is reduced due to the reduction of the effective bandwidth (for each channel), (b) the capacitance of the photo diode can be "neutralized" with inductors or can be made part of a resonant cavity, since the information is modulated on a carrier with a "moderate bandwidth", (c) all of the electronic circuits and lasers are operated in parallel at lower speeds as compared with high speed serial operation, and (d) a further reduction in noise may be possible by using a new optoelectronic heterodyne technique (8), R. I. MacDonald and K. O. Hill, Avalanche Optoelectronic Downconverter, Optics Letters, 7, 83 (February 1982.) In at least some instances, the low speed parallel-operated FDM channels are more economical and more reliable than the high speed serially operated TDM (Time-Division-Multiplexing) system. Also, one of the carriers can be utilized as a clock for digital reception or for synchronized detection.

BRIEF DESCRIPTION OF THE DRAWINGS

The following partially schematic drawings constitute part of this disclosure, as to which.

DETAILED DESCRIPTION OF THE INVENTION

Figure 2:
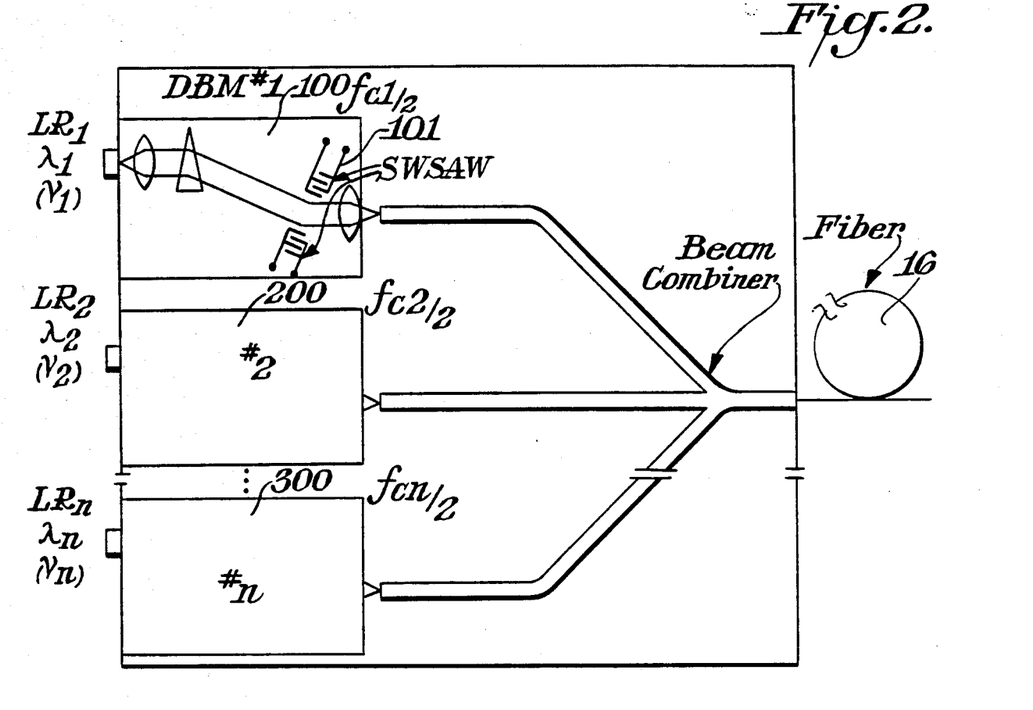
FIG. 2 is a representation, in integrated optics form, of a plurality of signal transmitters as they would be employed in this invention.

Referring to FIG. 2, the conventional laser input sub-assemblies incorporate parallel-connected units 100, 200 and 300 as to which individual laser input units $LR_1$, $LR_2$ and $LR_n$, respectively, deliver pulsed radiation outputs of wavelengths $\lambda_1$, $\lambda_2$ and $\lambda_n$, respectively. Individual laser sub-assemblies 100, 200 and 300 are preselected to deliver radiation wavelengths $\lambda_1, \lambda_2 \ldots \lambda_n$, (corresponding to frequencies $\nu_1, \nu_2, \ldots \nu_n$,) spaced one nanometer or more apart, which is easily achieved because of the relatively wide wavelength separations existing between lasers as normally produced in manufacture.

Laser sub-assemblies 100, 200 and 300 are similar to Integrated-Optic Spectrum Analyzers (IOSA) of designs described by D. Mergerian and E. C. Malarkey in their publication *Integrated-Optic Spectrum Analyzer: Current Status*, p. 114, Technical Digest of the Third International Conference on Integrated Optics and Optical Fiber Communication (IOOC '81), Apr. 27-29, 1981, and references cited therein, and by T. R. Ranganath, *Integrated-Optic Spectrum Analyzer: A First Demonstration*, p. 114, Technical Digest of the Third International Conference on Integrated Optics and Optical Fiber Communication (IOOC'81), Apr. 27-29, 1981, San Francisco, CA.

Each channel is provided with a Standing Wave Surface Acoustic Wave Modulator (SWSAWM), only that denoted 101 for sub assembly unit 100 being shown in FIG. 2, which preferably employs two sets of interdigital fingers. If desired, a two-phase driving configuration similar to that described by H. A. Haus, *Picosecond Optical Sampling*, Proceedings of the joint meeting of the NSF Grantee-User Group in Optical Communication and the National Telecommunications and Information Administration Task Force on Optical Communications, May 27-29, St. Louis, Mo., can be used.

A preferred embodiment of the detailed apparatus is described (refer FIG. 1) in conjunction with the operation, which is as follows. The pulsed laser output at wavelength $\lambda_1$ is first collimated by lens 10, which can conveniently be a lens similar to a microscope objective or a geodesic lens used for integrated optics. A wavefront correction optics (WCO) element 12, typically an anamorphic lens, may be required to correct the wavefront distortion of laser diode $LR_1$, and this is followed by Standing Wave Acousto-Optic Modulator 14, typically a commercially available acousto-optical modulator such as Model SWM-40 made by Intra-Action Corporation, or a double SAW used in integrated-optics provided with sub-carrier frequency input. Sub-carrier frequency $F_c$ (introduced into the SWAOM as the $F_c/2$ in this embodiment) can be, typically, several tens of mHz up to several GHz as compared with laser diode frequency at $3 \times 10^{14}$ Hz, typically. The collimated laser beam is passed through SWAOM 14 at the Bragg angle. The diffracted beam from 14 is focused by lens 15 which is similar to lens 10, and coupled to an optical fiber 16, typically a commercially available fiber, for transmission.

Figure 1:
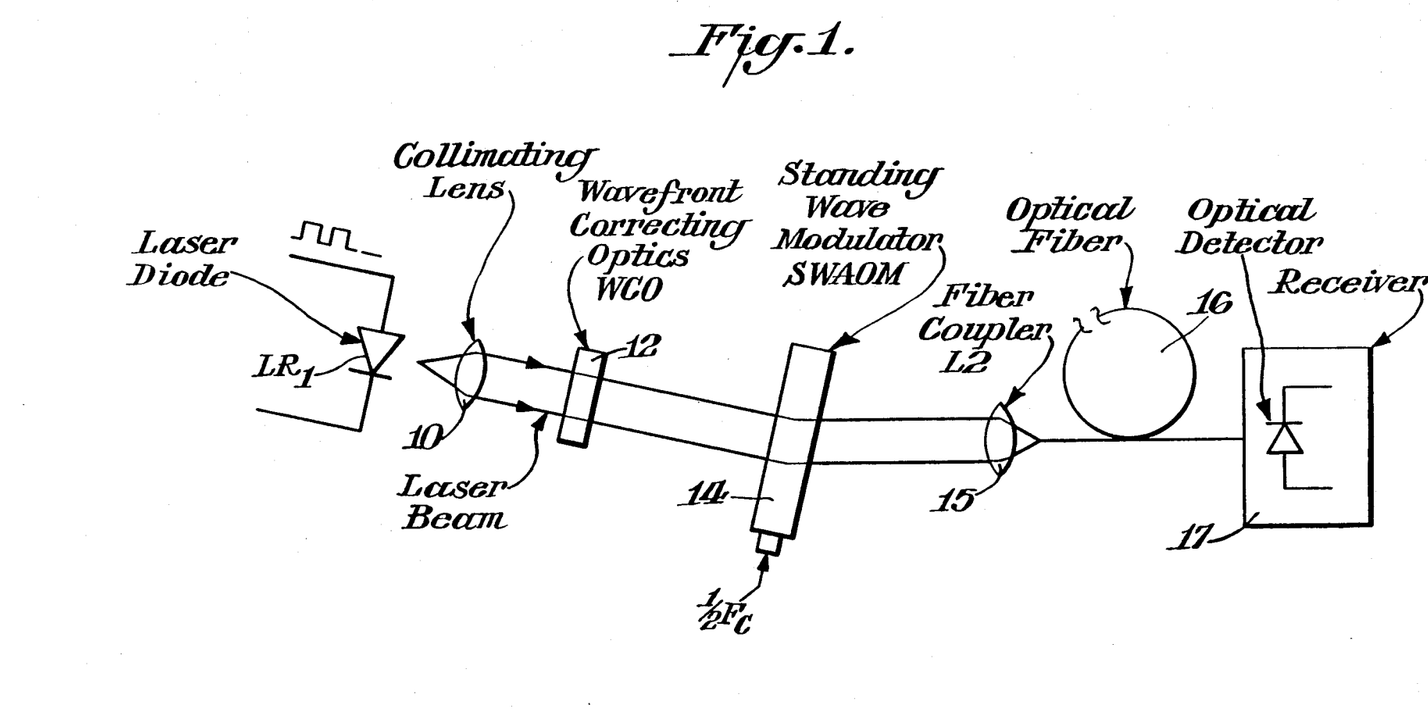
FIG. 1 is an overall representation of a preferred embodiment of apparatus according to this invention, showing only a single signal transmitter.

If SWAOM 14 is driven in continuous wave (CW) mode at a frequency $F_c\frac{1}{2}$, the diffracted beam contains two frequency components, one at $\nu_1+(\frac{1}{2}) F_{c1}$ and the other at $\nu_1-(\frac{1}{2}) F_{c1}$. A square law detector 17, typically a semiconductor high frequency photodiode, will detect the beat frequency of these two frequency components, which is $F_{c1}$. Therefore, this system is effectively a double side band (DSB) modulation with the carrier suppressed.

Since the described modulator, which can be termed double beam modulation (DBM), automatically and effectively put the original optical pulse on a carrier, a FDM system for digital transmission can be devised in integrated optic form such as shown in FIG. 2.

The output (optical pulses) of lasers $LR_1$, $LR_2$, ... $LR_n$ at wavelengths $\lambda_1, \lambda_2, \ldots \lambda_n$ (at frequencies ($\nu_1$), ($\nu_2$) ... ($\nu_n$), respectively) are modulated on sub-carriers $F_{c1}, F_{c2}, \ldots F_{cn}$, respectively. The modulated optical beams are combined to form a single output coupled to optical fiber 16. Since the individual channels are separated in the radio frequency range vhf, uhf to microwave) at frequency $F_{c1}, F_{c2}, \ldots F_{cn}$, the exact wavelengths and separations of $\lambda_1, \lambda_2, \ldots \lambda_n$ of the lasers are not as important, as long as they do not overlap into the $F_{cn}$'s. This condition can be easily satisfied. Thus, if the wavelengths are assured of a separation of 1 nm at a wavelength of 1 μm, this corresponds to a frequency separation of 300 Ghz, which is much higher than what the current state of technology can provide for the $F_{cn}$'s. This would have the same effect of the subnanometer wavelength multiplexing proposed and investigated previously, as described in references 1, 3 supra.

Figures 3, 4:
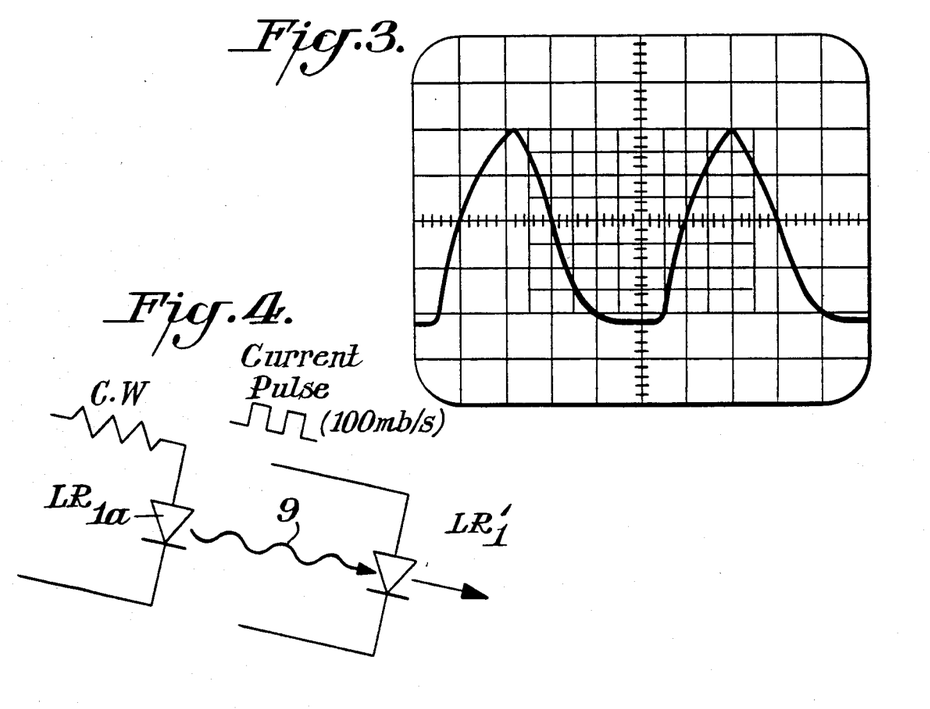
FIG. 3 is an oscilloscopic trace of a feasibility demonstration of the double beam modulated signal obtained with this invention.
FIG. 4 is a representation of an apparatus auxiliary according to this invention utilizing two lasers, injection-locked, to produce highly monochromatic pulsed radiation for long distance single mode fiber transmission.

I have demonstrated the concept of this invention using a He-Ne laser $LR_1$. The laser beam is first modulated by a traveling wave acousto-optic modulator, not shown in FIG. 1, at 2 mbit (1 m Hz square wave). The modulated beam is then passed through a Standing Wave AOM 14 driven (CW) at approximately 40 mHz. The diffracted beam is coupled into a 1 km optical fiber 16. The receiver 17 incorporates a square law detector, typically a high frequency photo diode, and a modified commercial TV receiver tuned to channel 5 (76-82 mHz). The load of the diode is a parallel resonant circuit tuned to 80 mHz., so that the capacitance of the diode was effectively neutralized by the inductor. The output of the diode is then matched to the input impedance of the TV receiver. The TV receiver was modified so that its video output could be observed on an oscilloscope. The received signal is shown in FIG. 3. The slow risetime and falltime were mainly due to the limited bandwidth of the TV receiver.

The apparatus of this invention can be used with multi-mode (longitudinal laser service as long as the modal spacing is much larger than, and the frequency spectrum of each mode is much smaller than, the subcarrier frequencies, $F_{c1}, F_{c2}, \ldots F_cn$. These conditions, can be satisfied for injection lasers. The DBM modulated beam can be transmitted through a multi-mode optical fiber 16 within its bandwidth (-length), i.e., BWL. The optical fiber used for the demonstration was a step-indexed fiber with a BWL of 50 mHz-km. Applicant's signal, which was equivalently modulated on an 80 mHZ carrier, was successfully transmitted through the 1 km fiber length. The He-Ne laser had an output of 2 mw. The pulse modulated beam had only 1 mw. The attenuation of the optical fiber 16 was 10 db/km at 632.8 nm.

The potentially very large information bandwidth system hereinabove described can be most efficiently utilized in a coherent transmission system in which single mode lasers and single mode optical fibers are employed. In this case, the general transmission characteristic of the DBM system can be analyzed.

The complex field of the modulated beam, $E_1$, can be represented by, $$E_1 = g(t)\exp[j(w_o+w_c/2)t] + g(t)\exp[j(w_o-w_c/2)t] \quad (1)$$

where $w_o = 2\pi f_o$ and $w_c = 2\pi f_c$.

If the fiber dispersion can be neglected, i.e., the linear case, the complex field at the receiving end, $E_2$, is, $$E_2 = g(t-T_gL)\exp[j(w_o+w_c/2)(t-T_pL)] + g(t-T_gL)\exp[j(w_o-w_c/2)(t-T_pL)] \quad (2)$$

where $T_p$ is the phase delay, $T_g$ group delay and L the fiber length. The detected signal current can be represented by, $$i \propto E_2 E_2^*[g(t-T_gL)]^2 \exp[jw_c(t-T_pL)] + \text{c.c.} \quad (3)$$

where c.c. and the superscript star each represent the complex conjugates, or be written in the real form, $$i \propto [g(t-T_gL)]^2 \cos[w_c(t-T_pL)] \quad (4)$$

Therefore the original signal, except a time delay, can be recovered faithfully.

Next we consider the case where the fiber dispersion cannot be neglected. The transfer function of the fiber is given by, $$H(w) = \exp[jB(w)L] \quad (5)$$

The B(w) can be expanded in a Taylor series around $w_o+(\frac{1}{2})w_c$ and $w_o-(\frac{1}{2})w_c$ and are given by, $$\quad (6)$$

$$\begin{aligned}B(w) &= B(w_o+w_c/2) + \dot{B}(w_c+w_c/2)[w-(w_o+w_c/2)] + \\&\quad (1/2)\ddot{B}(w_o+w_c/2)[w-(w_o+w_c/2)]^2 + \ldots \\&= T_{p+}(w_o+w_c/2) + T_{g+}(w_o+w_c/2)[w-(w_o+w_c/2)] + (1/2)\dot{T}_{g+}(w_o+w_c/2)[w-(w_o+w_c/2)]^2 + \ldots\end{aligned}$$

$$\quad (7)$$

$$\begin{aligned}B(w) &= B(w_o-w_c/2) + \dot{B}(w_o-w_c/2)[w-(w_o-w_c/2)] + \\&\quad (1/2)\ddot{B}(w_o-w_c/2)[w-(w_o-w_c/2)]^2 + \ldots \\&= T_{p-}(w_o-w_c/2) + T_{g-}(w_o-w_c/2)[w-(w_o-w_c/2)] + (1/2)\dot{T}_{g-}(w_o-w_c/2)[w-(w_o-w_c/2)]^2 + \ldots\end{aligned}$$

where $T_p\pm$, $T_g\pm$, and $\dot{T}_g\pm$ are the phase delay, group delay, and the first order dispersion at $w_o\pm(\frac{1}{2})w_c$ respectively.

The complex field of the received beam, $E_2'$, is given by, $$E_2' = g_+(t-T_{g+}L)\exp[j(w_o+w_c/2)(t-T_{p+}L)] + g_-(t-T_{g-}L)\exp[j(w_o-w_c/2)(t-T_{p-}L)] \quad (8)$$

Where $$g_+(t-T_{g+}L) = \quad (9)$$

$$\frac{1}{2\pi}\int_{-\infty}^{+\infty} F(w)\exp[-j(1/2)T_{g+}L]\exp[jw(t-T_{g+}L)]dw$$

$$g_-(t-T_{g-}L) = \quad (10)$$

$$\frac{1}{2\pi}\int_{-\infty}^{+\infty} F(w)\exp[-j(1/2)T_{g-}L]\exp[jw(t-T_{g-}L)]dw$$

and F(w) is defined by the Fourier transform and given by, $$g(t) = \frac{1}{2\pi}\int_{-\infty}^{+\infty} F(w)\exp[jwt]dw \quad (11)$$

The received signal current is give by, $$i \propto E_2' E_2'^*[g_+(t-T_{g+}L)][g_-(t-T_{g-}L)]\exp[jw_c t+\theta] + \text{c.c.} \propto [g_+(t-T_{g+}L)][(g_-(t-T_{g-}L)]\cos(w_c t+\theta) \quad (12)$$

Where $\theta = w_o(T_{p-}-T_{p+})L - (\frac{1}{2})w_c(T_{p+}-T_{p-})L$.

Since $w_c << w_o$, we expect that $T_{g+} = T_{g-}$, $\dot{T}_{g+} \cong \dot{T}_{g-}$, and $T_{g+}-T_{g-} = w_c \dot{T}_{go}$. Also, $\dot{T}_g$'s are higher order derivates of B(w), and the difference between the $\dot{T}_g$'s shuld be even smaller than that of the $T_g$'s. Therefore the waveforms of the $g_+$ and $g_-$ are similar but with a slightly different time delay which can, however, be compensated for as hereinafter described. This would not affect the detection of digital pulses as long as the delay is smaller than the pulse width. There is also an extra phase term in the carrier. Since $w_c << w_o$, we expect that $T_{p+}+T_{p-} \cong 2T_{po}$, where $T_{po}$ is the phase delay at $w_o$. The detected signal current can then be written as, $$i' \propto [g_+(t-T_{g+}L)][g_-\{t-(T_{g+}L-w_c\dot{T}_{go}L)\}]\cos[w_c(t-T_{po}L)-\theta)] \quad (13)$$

Where $\theta = w_o(T_{p+}-T_{p-})L$

The extra phase term in the carrier does not affect the detection of the signal. The differential time delay in $g_+$ and $g_-$, which is proportional to $w_c \cdot T_{go} \cdot L$, is a more dominant term. One way of compensating for different time delays in the waveforms of $g_+$ and $g_-$ mentioned supra is to utilize the split beam apparatus adapted from that of FIG. 5, Ih U.S. Pat. No. 4,210,803, identified as reference (5) in this Application as shown herein also as FIG. 5. In this embodiment modulator 14'' is a traveling wave acousto-optical modulator (TWAOM) driven by sub-carrier frequency $F_c$. Here a planar glass plate 19, or other conventional delay element adapted such as to increase the optical path length, can be interposed in the necessary one of the radiation paths as to which radiation transit is to be delayed, thereby compensating the radiations transit through the optical fiber 16''.

Figure 5:
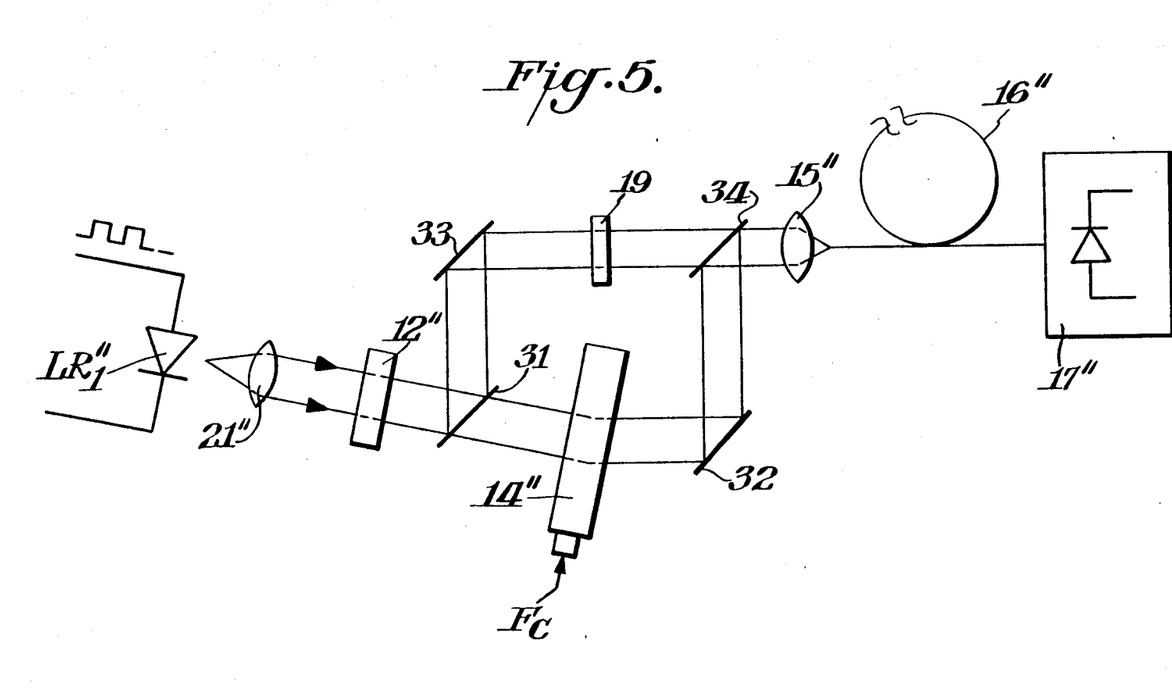
FIG. 5 is a representation of a split beam embodiment of apparatus according to this invention incorporating a time delay element in a preselected radiation beam adapted to effect signal (dispersion) compensation.

In FIG. 5 all of the common components shown in FIG. 1 are reproduced, and each is denoted by the same reference characters as in FIG. 1, except double primed. Mirrors 31 and 34 are conventional beam splitters, whereas mirrors 32 and 33 are full reflection types. For single mode fibers and for $w_c$'s in the range of my interest (i.e., tens of GHz), the differential time delay term should be very small, therefore high frequency carriers can be used. For a zero dispersion fiber, i.e., a linear system, this term is zero as expected. Therefore the described system can make good use of the high information bandwidth of single mode fibers without using high speed lasers, detectors and electronics.

Figure 6:
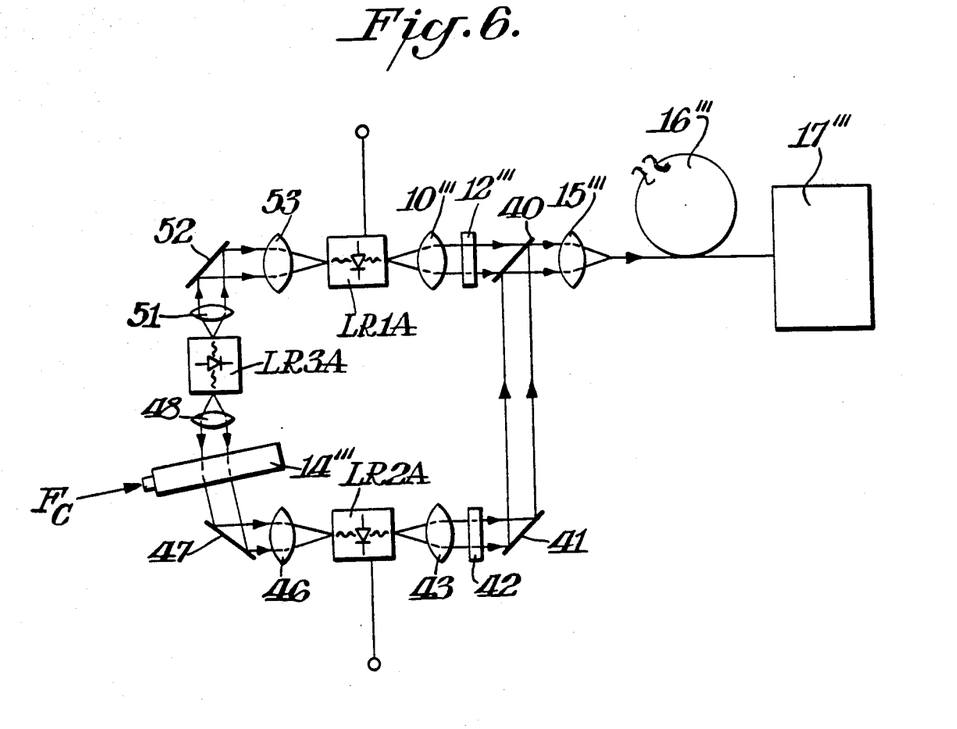
FIG. 6 is a representation of an embodiment of apparatus according to this invention effecting signal (dispersion) compensation utilizing two lasers injection-locked to a third laser.

Another way of achieving dispersion compensation utilizing laser injection locking is the embodiment of FIG. 6. This embodiment utilizes a traveling wave modulator 14''' with the driving frequency therefore being $F_c$. Again, all components shown in FIG. 1 are reproduced and denoted by the same reference characters as in FIG. 1, except triple primed.

Referring to FIG. 6, the information signal is introduced via LR1A, which is injection-locked, on one side, to laser LR3A via collimating lens 51, full reflectance mirror 52, and focusing lens 53. LR2 A is injection-locked on the other side to laser LR3A via collimating lens 48, traveling wave acousto-optical modulator (TWAOM) 14''' driven by sub-carrier frequency $F_c$, full reflectance mirror 47 and focusing lens 46. The output of LR2A, frequency shifted relative to its input from LR3A, is routed via collimating lens 43, anamorphic lens 42 and full reflectance mirror 41 to beam splitter 40 where it combines with the information wave train which is thence transmitted to coupler 15''' into optical fiber 16''' and thereafter processed through a square law detector (not here detailed) to the receiver 17''' as hereinbefore described.

Figure 6A:
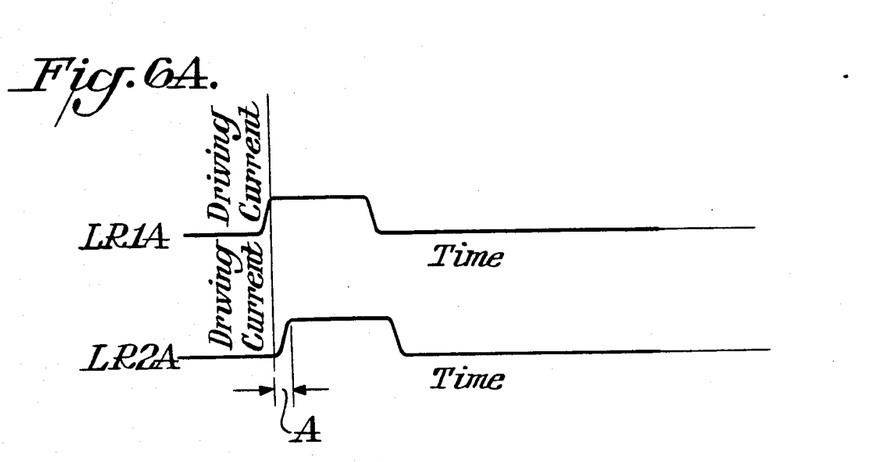
FIG. 6A is a schematic Driving Current v. Time representation of a pair of time-coordinated electrical signals illustrating the optical delay compensation achieved by the apparatus of FIG. 6.

In operation, it is now practicable to pulse lasers LR1A and LR2A with a slight time delay A, as shown in FIG. 6A, to achieve dispersion compensation with the same effect of optical delay as hereinbefore described for the complete integrated optics embodiment of FIG. 5. The embodiment of FIG. 6 is particularly advantageous for the production of highly monochromatic radiation for long distance single mode fiber transmission.

In the system shown in FIG. 2, each channel is on a separate carrier. The totally (sub)carriered channel system can be made compatible for simultaneous transmission with conventional digital signals. For every pulse received on each channel, there is a corresponding "dc" pulse in the baseband. Therefore, the baseband is "polluted" with these "dc" terms from all the channels. However, the waveform of the dc term pulse is nearly identical to that of the pulse demodulated from the carrier. Therefore, they can be cancelled out electronically.

Even though the system herein described is mainly for digital transmissions, it can also be used for analog information under special conditions. The requirement is that the signal to be DBM modulated must have a strong dc term, such as a typical TV signal, or that if the signal is already modulated on another carrier, the carrier must be stronger than its sidebands. In fact, we have transmitted and received TV signals of comparable quality under similar conditions as those obtained with TDHM [references 2, 4 supra].

A practicable scheme for utilizing the described FDM system for a fiber optical communication system can be the following. A baseband of approximately up to and including 1 GHz is reserved for conventional digital and/or analog information transmission. Five DBM-FDM channels are operated at 2.5, 3.0, 3.5, 4.0, and 4.5 GHz at 200 mbit/sec per channel. The five channels alone will provide a 1 Gb/s capacity. The electronic cancellation scheme described previously may be necessary to clean up the "pollution" between the 0-200 mHz in the baseband. The maximum operating frequency of the AO or SAW modulators is only 2.25 GHz. Sapphire acoustoptical cells have been reported to operate up to 13 GHz [11]. Therefore acoustooptical cells of good efficiency can be expected at 2.25 GHz. The next higher frequency range in which DBM-FDM can be used in the same fiber system will be from 10 GHz-20 GHz. If it is also desirable for information transmission below 1 GHz in the same fiber, frequency bands similar to those of TV broadcasting (54-88, 174-216, 470-890 mHz) can be used. These frequency band assignments minimize second harmonic interferences.

It is sometimes advantageous to utilize highly monochromatic radiation, especially for long distance single mode fiber transmission, and the apparatus of FIG. 4 permits this. Here the laser input $LR_1'$ can be identical with the $LR_1, \ldots LR_n$ units hereinbefore described, except that each is backed up by a d-c laser unit $LR_{1a}$, the radiation output 9 of which is directed to the laser $LR_1'$ where it reinforces the radiation output of the latter, stabilizing its output as a highly monochromatic quality which is thereafter processed in the same manner as described for FIGS. 1 and 2.

In summary, a new FDM system for fiber optical communication is described. It is suitable for digital transmission and can also be used for analog information under special conditions. The DBM system is essentially a DSB modulation with the carrier being suppressed. The "carrier" frequencies are generated by standing wave or traveling wave AO or SAW modulators. This system is most effective with coherent fiber transmissions and can be employed as an alternative to ultra high bit rate transmissions.

What is claimed is:

1. A frequency domain modulation system for optical fiber communication particularly useful for digital and analog signal transmission comprising, in the order recited, a plurality of parallel-connected signal input units each incorporating individual laser sources of unique frequency $F_o$ provided with individual means modulating the output radiations of said laser sources responsive to individual signal inputs to thereby impose an information signal onto said output radiations thereby establishing an individual optical information wave train, a collimating lens, means splitting said individual optical information wave train into first and second fractions, said first fraction being reserved as a first optical frequency component $F_o/2$, said second fraction being routed to a separate traveling wave acousto-optical modulator means introducing a sub-carrier signal of frequency $F_c$, thereby creating a second optical frequency component $F_o/2 \pm F_c$, means for combining said first and second optical frequency components to create a sub-carrier-modulated information wave train, an optical fiber coupler transmitting said resulting sub-carrier modulated information wave train through an optical fiber to a common square law detector where said sub-carrier frequency is detected as the beat frequency of said two optical frequency components, said information signal being recovered at the output of said square law detector by an information receiver, said information receiver isolating a preselected individual signal input according to its associated individual sub-carrier frequency, said individual sub-carrier frequencies being spaced one from another by a frequency interval forestalling interference in the reception of said individual signal inputs.

2. A frequency domain modulation system for optical fiber communication according to claim 1 wherein said first optical frequency component $F_o/2$ is passed through an optical delay element preselected to effect dispersion correction in said optical information wave train prior to combining said first and said second optical frequency components.

3. A frequency domain modulation system for optical fiber communication particularly useful for digital and analog signal transmission comprising, a plurality of parallel-connected signal input units each incorporating individual laser sources of unique frequency $F_o$ provided with individual means modulating the output radiations of said laser sources responsive to individual signal inputs to thereby impose an information signal onto said output radiations thereby establishing an individual optical information wave train, consisting of an optical configuration providing means for dispersion compensation utilizing laser injection locking an optical configuration incorporating three lasers wherein LR1A is a first laser and LR2A is a second laser through each of which said individual optical information wave train incorporating said unique laser frequency $F_o$ is introduced, said first laser LR1A being directly injectionlocked to a third laser LR3A, and said sub-carrier frequency $F_c$ is input via a traveling wave acousto-optical modulator interposed between the output of said third laser, LR3A, and said second laser, LR2A, which frequency shifts its output from said third laser LR3A, and said second laser is injection-locked to the frequency shifted beam of said third laser LR3A whereby the output of said second laser LR2A has a frequency $F_o \pm F_c$, means combining the output of said first laser LR1A including said frequency $F_o$ as said optical frequency component with said output of said laser LR2A having said frequency $F_o \pm F_c$ as said second optical frequency component to create said sub-carrier modulated information wave train, said first and second lasers being pulsed at a preselected slight time delay achieving dispersion compensation of said information wave train.

* * * * *